United States Patent
Kuo et al.

(10) Patent No.: US 9,570,922 B2
(45) Date of Patent: Feb. 14, 2017

(54) CHARGING METHOD AND ELECTRONIC DEVICE

(71) Applicant: Acer Incorporated, New Taipei (TW)

(72) Inventors: Chun-Chih Kuo, New Taipei (TW); Che-Wei Lin, New Taipei (TW); Meng-Chieh Tsai, New Taipei (TW)

(73) Assignee: Acer Incorporated, New Taipei (TW)

( * ) Notice: Subject to any disclaimer, the term of this patent is extended or adjusted under 35 U.S.C. 154(b) by 153 days.

(21) Appl. No.: 14/668,999

(22) Filed: Mar. 26, 2015

(65) Prior Publication Data

US 2015/0318719 A1    Nov. 5, 2015

(30) Foreign Application Priority Data

May 2, 2014 (TW) .............. 103115822 A

(51) Int. Cl.
 *H01M 10/44* (2006.01)
 *H01M 10/46* (2006.01)
 *H02J 7/00* (2006.01)
 *G06F 1/26* (2006.01)

(52) U.S. Cl.
 CPC .............. *H02J 7/00* (2013.01); *G06F 1/266* (2013.01); *H02J 7/007* (2013.01); *H02J 7/0052* (2013.01); *H02J 2007/0062* (2013.01)

(58) Field of Classification Search
 CPC ...... H02J 7/0011; H02J 7/0008; H02J 7/0026; H02J 7/0021; H02J 2007/0062
 USPC ............. 320/111, 114, 115, 132, 133, 162
 See application file for complete search history.

(56) References Cited

U.S. PATENT DOCUMENTS

| | | | | |
|---|---|---|---|---|
| 2013/0099757 A1* | 4/2013 | Ham | ............ | H02J 7/0047 320/150 |
| 2014/0040649 A1* | 2/2014 | Lee | ............ | G06F 1/3234 713/323 |

FOREIGN PATENT DOCUMENTS

| | | |
|---|---|---|
| CN | 102290833 | 12/2011 |
| TW | 201117517 | 5/2011 |
| TW | 201227312 | 7/2012 |
| TW | 201239603 | 10/2012 |
| TW | 201407920 | 2/2014 |

* cited by examiner

*Primary Examiner* — Edward Tso
(74) *Attorney, Agent, or Firm* — Jianq Chyun IP Office

(57) ABSTRACT

A charging method for an electronic device having a charging unit and a connection interface unit and the electronic device are provided. The connection interface unit is externally connected to a peripheral device. The charging method includes: detecting a signal level between the charging unit and the connection interface unit; and when a time period that the detected signal level keeps on a particular level is over a threshold, resetting the connection interface unit, so as to restart a charging function of the electronic device for the peripheral device.

12 Claims, 2 Drawing Sheets

CHARGING METHOD AND ELECTRONIC DEVICE

CROSS-REFERENCE TO RELATED APPLICATION

This application claims the priority benefit of Taiwan application serial no. 103115822, filed on May 2, 2014. The entirety of the above-mentioned patent application is hereby incorporated by reference herein and made a part of this specification.

BACKGROUND OF THE INVENTION

Field of the Invention

The invention generally relates to a charging technology, and in particular, to a charging method and an electronic device.

Description of Related Art

With the lifestyle changes, nowadays people's lives have a close relationship with portable electronic devices such as mobile phones or tablet PCs. Based on the power limitation of the battery, takes the mobile phone as an example, after the mobile phone is continuously used for one to two days, the mobile phone is generally needed to be charged. Generally, the portable electronic devices can not only be charged via an adapter connected to an electrical outlet, but also be charged through a universal serial bus (USB) interface connected to a computer.

The usual USB charging specification includes standard downstream port (SDP) specification, charging downstream port (CDP) specification, and dedicated charging port (DCP) specification. The corresponding charging current of the SDP specification is below about 500 mA, while the corresponding charging current of the CDP specification and the DCP specification may be up to about 1.5 A.

However, takes the mobile phone charged by the notebook as an example, when the notebook performs a state transition, such as the operating system of the notebook changes from a normal working state (such as S0) into an abnormal working state (such as S3), the notebook may stop charging the mobile phone due to the system compatibility issues.

SUMMARY OF THE INVENTION

Accordingly, the invention provides a charging method and an electronic device using the same, which may identify the situation that the electronic device stops charging the peripheral device due to the state transition of the operating system of the electronic device, and may immediately restore the charging function of the electronic device for the peripheral device.

The invention provides a charging method which is suitable for an electronic device having a charging unit and a connection interface unit, where the charging unit is coupled to the connection interface unit, and the connection interface unit is externally connected to a peripheral device. The charging method includes: detecting a signal level between the charging unit and the connection interface unit; when a time period that the detected signal level keeps on a particular level is over a threshold, resetting the connection interface unit, so as to restart a charging function of the electronic device for the peripheral device.

The invention further provides an electronic device includes a connection interface unit, a charging unit and a charge control module. The connection interface unit is externally coupled to a peripheral device. The charging unit is coupled to the connection interface unit. The charge control module is coupled to the connection interface unit and charging unit. The charge control module is configured to detect a signal level between the charging unit and the connection interface unit. When a time period that the detected signal level keeps on a particular level is over a threshold, the charge control module resets the connection interface unit, so as to restart a charging function of the electronic device for the peripheral device.

Based on the above, the invention provides a charging method and an electronic device which may detect the signal level between the charging unit and the connection interface unit. When a time period that the detected signal level keeps on a particular level (such as a high level) is over a threshold, the connection interface unit is immediately reset by imitating a hot swapping action, so as to restart a charging function of the electronic device for the peripheral devices. Therefore, the probability that the electronic device accidentally stops charging for the peripheral device may be reduced.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
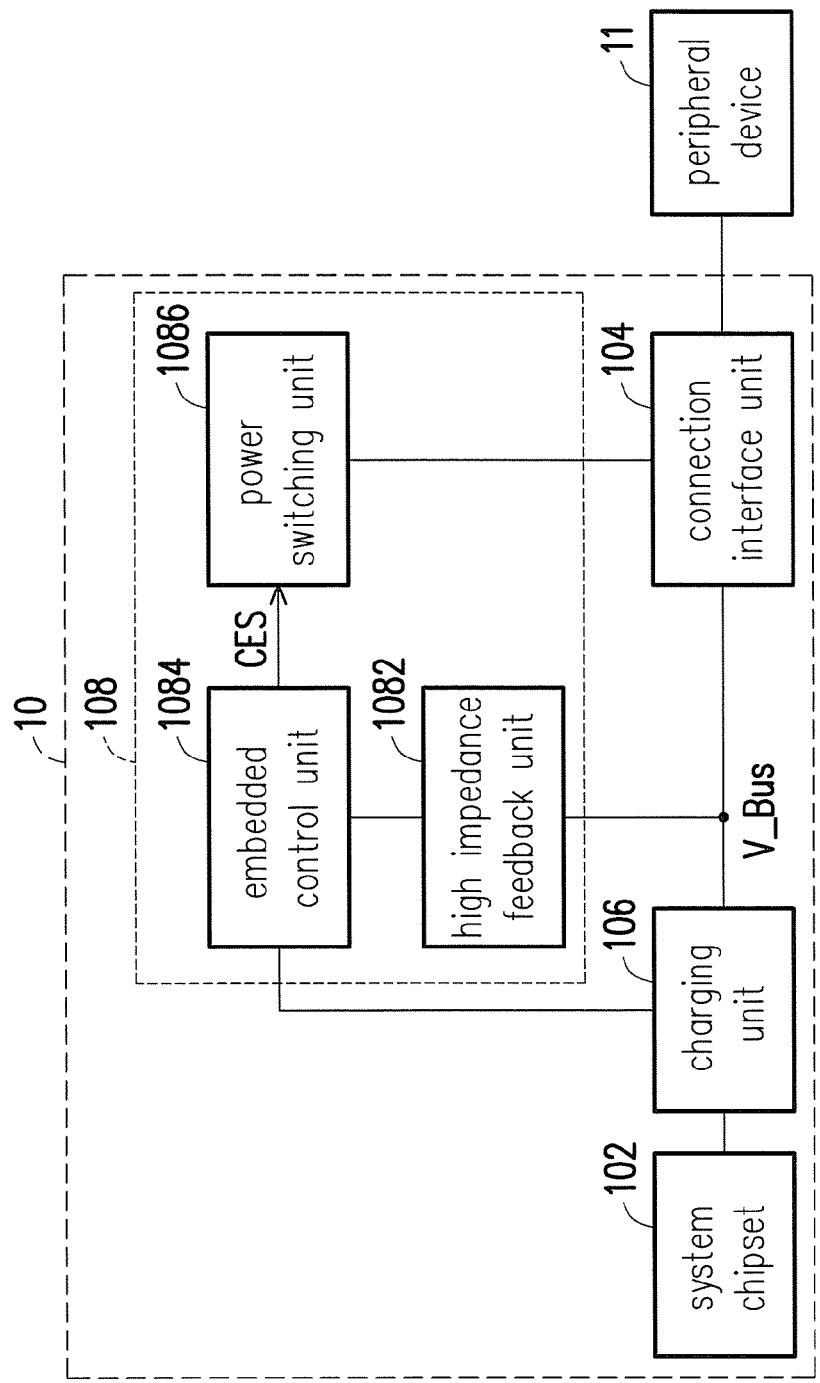
FIG. 1 is a schematic diagram illustrating an electronic device according to an embodiment of the invention.

FIG. 1 is a schematic diagram illustrating an electronic device according to an embodiment of the invention. Referring to FIG. 1, the electronic device 10 may be an electronic device, such as a tablet PC, a notebook, a desktop and a television etc., which may provide an externally charging function. The peripheral device 11 is an electronic device, such as a mobile phone, a smart phone, a tablet PC and a gamer, etc., which has a rechargeable battery.

The electronic device 10 includes a system chipset 102, a connection interface unit 104, a charging unit 106 and a charge control module 108. The system chipset 102 may include a central processing unit (CPU) and a platform controller hub (PCH), etc., which is required for operation of the electronic device 10. The system chipset 102 may run one or more operating system (OS), such as Microsoft Windows operating system or iOS, etc., but the invention is not limited herein. The connection interface unit 104 may be externally coupled to the peripheral device 11. In the embodiment, the connection interface unit 104 includes a universal serial bus (USB) interface. The electronic device 10 may be coupled to the peripheral device 11 through the connection interface unit 104, and then charges the peripheral device 11.

The charging unit 106 is coupled to the connection interface unit 104. In the embodiment, the charging unit 106 is, for example, a charge IC which is set inside the electronic device 10. When the peripheral device 11 is externally coupled to electronic device 10, the charging unit 106 may decide to use what kind of the specification for charging the peripheral device 11. For example, the charging unit 106 may choose one of the USB charging specification, such as Standard Downstream Port (SDP), Charging Downstream Port (CDP) and Dedicated Charging Port (DCP), etc., for charging the peripheral device 11. The charging specification specifies the amount of charging current provided by the electronic device 10 through the connection interface unit 104 to the peripheral device 11. For example, the electronic device 10 may provide different charging current to the peripheral device 11 according to the remaining power of the peripheral device 11. In addition, the charging unit 106 may obtain the specification information of the peripheral device 11 through the connection interface unit 104 and determine to use which kind of charging specification for charging the peripheral device 11 according to the specification information.

The charge control module 108 is coupled to the connection interface unit 104 and the charging unit 106. The charge control module 108 may provide corresponding charging current to the connection interface unit 104 according to the charging specification determined by the charging unit 106, so as to charge the peripheral device 11 through the connection interface unit 104.

Generally, when the working state of the current running operating system of the system chipset 102 changes, for example, switching from one of the normal working state (e.g., S0) and the abnormal working states (e.g., S1 to S5), such as standby, sleep, hibernate, etc., to another, the charging unit 106 may re-determined to use what kind of charging specification for charging the peripheral device 11. For example, the charging unit 106 may obtain the specification information of the peripheral device 11 through the connection interface unit 104 again, and determine to use what kind of charging specification for charging the peripheral device 11 accordingly. However, based on some reasons (such as compatibility issues between the peripheral device 11 and the charging unit 106), when the working state of the running operating system of the system chipset 102 changes, the signal transmission between the charging unit 106 and the connection interface unit 104 may be abnormal, such that the charging unit 106 is unable to determine using what kind of charging specification to charge the peripheral device 11. In the case, the charge control module 108 may stop charging the peripheral device 11.

For example, in case that the signal is normally transmitted between the charging unit 106 and the connection interface unit 104, corresponding to the signal "0" and "1", the signal level V_Bus of the bus between the charging unit 106 and the connection interface unit 104 may be constantly changed between the high level and the low level. By contrast, in case that the signal transmission between the charging unit 106 and the connection interface unit 104 is abnormal, the signal level V_Bus of the bus between the charging unit 106 and the connection interface unit 104 may be maintained at a particular level, such as maintained at high level or low level and continued for a long time period.

Accordingly, in the embodiment, the charge control module 108 may be coupled to the bus (USB+ bus or USB− bus), between the charging unit 106 and the connection interface unit 104, for communicating with the charging unit 106 and the connection interface unit 104, so as to detect the signal level V_Bus between the charging unit 106 and the connection interface unit 104. When the signal level V_Bus between the charging unit 106 and the connection interface unit 104 keeps at a particular level for a time period which is over a threshold, based on the above reasoning, the charge control module 108 may determine that the charging function of the peripheral device 11 is failed. Therefore, the charge control module 108 may reset the connection interface unit 104, so as to restart the charging function of the electronic device 10 for the peripheral device 11.

In the present embodiment, the charge module 108 may include a high impedance feedback unit 1082, an embedded control unit 1084 and a power switching unit 1086. The input terminal of the high impedance feedback unit 1082 is coupled between the charging unit 106 and the connection interface unit 104, and the output terminal of the high impedance feedback unit 1082 is coupled to the embedded control unit 1084. The high impedance feedback unit 1082 provides high resistance, so as to reduce the influence to the signal transmission between the charging unit 106 and the connection interface unit 104. For example, the high impedance feedback unit 1082 includes one of the metal oxide semiconductor (MOS) and diode, or the combination thereof. In addition, the embedded control unit 1084 is, for example, an embedded controller, and the charge control unit 1086 may deter mine whether to provide the charging current to the connection interface unit 104 and the amount of the current (i.e., the charging current) provided to the connection interface unit 104. Through the high impedance feedback unit 1082 (e.g., according to the output of the output terminal of the high impedance feedback unit 1082), the charge control module 108 (or the embedded control unit 1084) may easily obtain the signal level V_Bus between the charging unit 106 and the connection interface unit 104.

In the present embodiment, the charge control module 108 (or the embedded control unit 1084) may continuously detect the signal level V_Bus between the charging unit 106 and the connection interface unit 104, but the invention is not limited thereto.

In an embodiment, the charge control module 108 (or embedded control unit 1084) only detects the signal level V_bus between the charging unit 106 and the connection interface unit 104 in a specific time range after the working state of the current running operating system of the system chipset 102 changes. Beyond the specific time range, the charge control module 108 (or the embedded control unit 1084) stops detecting the signal level V_bus between the charging unit 106 and the connection interface unit 104, so as to save unnecessary power consumption. The specific time range described herein is, for example, any second between 1 to 3 second, which may be adjusted according to the practical requirements. For example, in case that the electronic device 10 idles for a long time or for other reasons, which leads the working state of the currently running operating system of the system chipset 102 to change from a normal working state (such as S0) to an abnormal working status (such as S3), the charging unit 106 may send a transforming signal to the embedded control unit 1084. Then, the embedded control circuit 1084 starts to continuously detect the signal level V_Bus between the charging unit 106 and the connection interface unit 104 in a specific time range (such as 5 seconds) in response to the transforming signal. Beyond the specific time range (such as 5 seconds), the embedded control unit 1084 stops detecting the signal level V_Bus between the charging unit 106 and the connection interface unit 104. Namely, since most of the charging abnormal interruptions occur at time points that the working state of the operating system of the electronic device changes, the embedded control unit 1084 may only determine whether the signal transmission between the charging unit 106 and the connection interface unit 104 is abnormal in the specific time range after the working state of the operating system changes, rather than other times beyond the specific time range, so as to save the power consumption.

After the signal level V_Bus between the charging unit 106 and the connection interface unit 104 is obtained, the embedded control unit 1084 may calculate each time period that the signal level V_Bus keeps on a particular level (such as high level) and determine whether each of the calculated time periods is over a threshold. For example, the threshold may be 2 seconds, which may be adjusted according to the practical requirements. When a time period is over the threshold, it means that the signal transmission between the charging unit 106 and the connection interface unit 104 has been abnormal, the embedded control unit 1084 may send a charge enable signal CES to the power switching unit 1086. When the power switching unit 1086 receives the charge enable signal CES, the power switching unit 1086 resets the connection interface unit 104 in response to the charge enable signal CES. For example, the power switching unit 1086 may stop providing power to the connection interface unit 104 and then restore providing power to the connection interface unit 104 immediately, so as to imitate a hot swapping action that the user pulls out the peripheral device 11 from the connection interface unit 104, and then re-connects the peripheral device 11 to the connection interface unit 104. Alternatively, in an embodiment, the power switching unit 1086 may send a reset command to the connection interface unit 104, and the connection interface unit 104 resets itself in response to the reset command, the invention is not limited thereto.

If the peripheral device 11 itself is not abnormal, the signal transmission between the charging unit 106 and the connection interface unit 104 may return to normal after resetting the connection interface unit 104. Then, the charging unit 106 may obtain the specification information of the peripheral device 11 through the connection interface unit 104 again, and the charge control module 108 may charge the peripheral device 11 through connection interface unit 104 after a suitable charging specification is determined by the charging unit 106. For example, the charging unit 106 may notice the embedded control unit 1084 that a charging specification is determined, and the embedded control unit 1084 may control the power switching unit 1086 to provide the appropriate charging current to the connection interface unit 104 for charging the peripheral device 11 accordingly.

Figure 2:
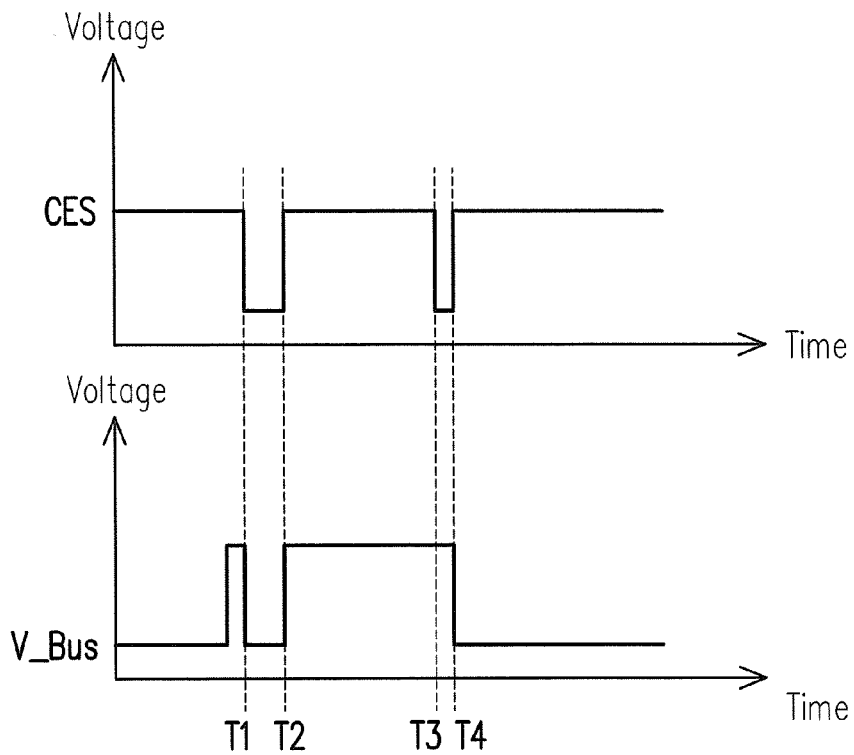
FIG. 2 is a waveform schematic diagram illustrating an abnormal signal transmission between the charging unit and the connection interface unit according to an embodiment of the invention.

FIG. 2 is a schematic waveform diagram illustrating an abnormal signal transmission between the charging unit and the connection interface unit according to an embodiment of the invention. Referring to FIG. 1 and FIG. 2, if the working state of the current running operating system of system chipset 102 changes, for example, from the normal working state (such as S0) to the abnormal working state (such as S3), at time point T1. In this case, the embedded control unit 1084 sends a charge enable signal CES with a pulse to the power switching unit 1086, while it is a predetermined action of the embedded control unit 1084. Then, if it is assumed that the signal level V_Bus between the charging unit 106 and the connection interface unit 104 is kept on a high level between the time points T2 to T3 (such as 2 second), that means the signal transmission is abnormal between the charging unit 106 and the connection interface unit 104. Therefore, the embedded control unit 1084 sends the charge enable signal CES with a pulse to the power switching unit 1086 again at the time point T3 or later, so as to control power switching unit 1086 to reset the connection interface unit 104. After resetting, the signal level V_Bus between the charging unit 106 and the connection interface unit 104 returns to normal at the time point T4.

Figure 3:
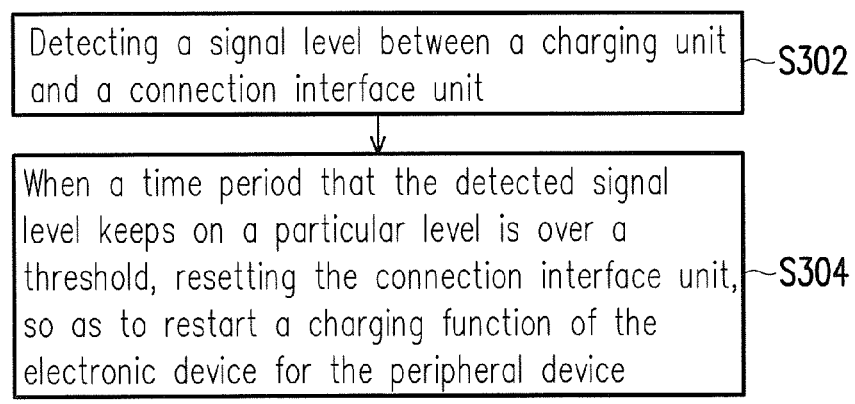
FIG. 3 is a flow chart diagram illustrating a charging method according to an embodiment of the invention.

FIG. 3 is a flow chart diagram illustrating a charging method according to an embodiment of the invention. Referring to FIG. 1 and FIG. 3, in the step S302, the charge control module 108 detects the signal level V_bus between the charging unit 106 and the connection interface unit 104. Next, in the step S304, when a time period that the detected signal level V_bus between the charging unit 106 and the connection interface unit 104 keeps on a particular level (such as a high level) is over a threshold, the charge control module 108 resets the connection interface unit 104, so as to restart a charging function of the electronic device 10 for the peripheral device 11.

The specific implementation details of the above method have been described in above embodiments, thus it will not be repeatedly described herein. Each step in FIG. 3 may be implemented as a software module or a hardware circuit, the invention is not limited thereto.

To sum up, the invention provides a charging method and an electronic device which may deter mine the scenario of the charging suspend according to the signal level between the charging unit and the connection interface unit, and restart charging process by resetting connection interface unit. For example, when the signal transmission between the charging unit and the connection interface unit is abnormal, and the electronic device stops charging the peripheral device, the invention may rapidly restore the charging function for the peripheral device without the hot swapping action performed by the user, thereby to effectively reduce the situation of unexpectedly stopping charging the peripheral device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A charging method for an electronic device having a charging unit and a connection interface unit, wherein the charging unit is coupled to the connection interface unit, and the connection interface unit is externally connected to a peripheral device, the charging method comprising:

detecting a signal level between the charging unit and the connection interface unit; and when a time period that the detected signal level keeps on a particular level is over a threshold, resetting the connection interface unit, so as to restart a charging function of the electronic device for the peripheral device.

2. The charging method according to claim 1, wherein the step of detecting the signal level between the charging unit and the connection interface unit comprises:

detecting the signal level between the charging unit and the connection interface unit through a high impedance feedback unit, wherein an input terminal of the high impedance feedback unit is coupled between the charging unit and the connection interface unit.

3. The charging method according to claim 2, wherein the high impedance feedback unit comprises one of a metal oxide semiconductor (MOS) and a diode, or a combination thereof.

4. The charging method according to claim 1, wherein the step of detecting the signal level between the charging unit and the connection interface unit comprises:
   receiving a transforming signal from the charging unit,
   detecting the signal level between the charging unit and the connection interface unit in a specified time range in response to the transforming signal; and
   stopping detecting the signal level between the charging unit and the connection interface unit beyond the specified time range.

5. The charging method according to claim 1, wherein the step of resetting the connection interface unit comprises:
   stopping providing power to the connection interface unit in response to a charge enable signal; and
   restoring providing power to the connection interface unit.

6. The charging method according to claim 1, wherein the connection interface unit comprises a universal serial bus (USB) interface.

7. An electronic device comprising:
   a connection interface unit coupled to a peripheral device;
   a charging unit coupled to the connection interface unit; and
   a charge control module coupled to the connection interface unit and the charging unit,
   wherein the charge control module is configured to detect a signal level between the charging unit and the connection interface unit,
   when a time period that the detected signal level keeps on a particular level is over a threshold, the charge control module resets the connection interface unit, so as to restart a charging function of the electronic device for the peripheral device.

8. The electronic device according to claim 7, wherein the charge control module comprising:
   a high impedance feedback unit, wherein an input terminal of the high impedance feedback unit is coupled between the charging unit and the connection interface unit; and
   an embedded control unit coupled to the output terminal of the high impedance feedback unit and the charging unit,
   wherein the embedded control unit detects the signal level between the charging unit and the connection interface unit through the high impedance feedback unit.

9. The electronic device according to claim 8, wherein the high impedance feedback unit comprises one of a MOS and a diode, or a combination thereof.

10. The electronic device according to claim 7, wherein the charge control module receives a transforming signal from the charging unit, and detects the signal level between the charging unit and the connection interface unit in a specified time range in response to the transforming signal,
    wherein the charge control module stops detecting the signal level between the charging unit and the connection interface unit beyond the specified time range.

11. The electronic device according to claim 7, wherein the charge control module comprises:
    an embedded control unit configured to generate a charge enable signal; and
    a power switching unit coupled to the embedded control unit and the connection interface unit,
    wherein the power switching unit stops providing power to the connection interface unit in response to the charge enable signal and restores providing power to the connection interface unit.

12. The electronic device according to claim 7, wherein the connection interface unit comprises a USB interface.

\* \* \* \* \*